(12) United States Patent
Tananko et al.

(10) Patent No.: US 7,304,020 B1
(45) Date of Patent: Dec. 4, 2007

(54) NANO-PARTICLE METAL TREATMENT COMPOSITION FOR CREATING A CERAMIC-METAL LAYER

(75) Inventors: Dmitry Tananko, 5675 Langlois Ave., West Bloomfield, MI (US) 48322; Olena Lyubchenko, Kharkov (UA); Oleksandr Oliinik, Kharkov (UA); Oleksandr Umanskiy, Kharkov (UA); Svitlana Aksyonova, Kharkov (UA)

(73) Assignee: Dmitry Tananko, West Bloomfield, MI (US)

( * ) Notice: Subject to any disclaimer, the term of this patent is extended or adjusted under 35 U.S.C. 154(b) by 0 days.

(21) Appl. No.: 11/465,852

(22) Filed: Aug. 21, 2006

(51) Int. Cl.
    *B22C 23/02* (2006.01)
(52) U.S. Cl. .................. 508/148; 508/161; 508/141; 508/165; 106/468; 106/36; 106/14.21; 106/14.26; 106/14.44
(58) Field of Classification Search ............. 106/468, 106/36, 14.21, 14.26, 14.44; 508/161, 141, 508/148, 165
See application file for complete search history.

(56) References Cited

U.S. PATENT DOCUMENTS

| | | | | |
|---|---|---|---|---|
| 2,970,162 A | * | 1/1961 | Brown, Jr. ................... | 556/10 |
| 3,194,759 A | * | 7/1965 | Devine et al. .............. | 508/152 |
| 3,256,188 A | * | 6/1966 | Papayannopoulos et al. .... | 508/575 |
| 3,985,916 A | | 10/1976 | Church et al. ............... | 427/46 |
| 4,431,553 A | * | 2/1984 | Fodor et al. ................. | 508/261 |
| 5,523,006 A | * | 6/1996 | Strumban .................... | 508/150 |
| 6,423,669 B1 | * | 7/2002 | Alexandrov et al. ........ | 508/161 |
| 6,955,834 B2 | | 10/2005 | Rohrbaugh et al. ......... | 427/180 |
| 6,986,854 B2 | | 1/2006 | Sumi et al. ................. | 264/141 |
| 7,141,535 B2 | * | 11/2006 | Belot et al. ................. | 508/136 |
| 2005/0056241 A1 | * | 3/2005 | Nomura et al. ............. | 123/90.6 |
| 2006/0019843 A1 | * | 1/2006 | Doner ......................... | 508/539 |

FOREIGN PATENT DOCUMENTS

| | | |
|---|---|---|
| RU | 2016050 | 7/1994 |
| RU | 2035636 | 5/1995 |
| RU | 2057257 | 3/1996 |
| RU | 2059121 | 4/1996 |
| WO | WO 92/18238 | 10/1992 |
| WO | WO 02/018673 | 3/2002 |

* cited by examiner

*Primary Examiner*—J. A. Lorengo
*Assistant Examiner*—Pegah Parvini
(74) *Attorney, Agent, or Firm*—Dickinson Wright, PLLC

(57) ABSTRACT

A metal treatment composition including Tin (II) Chloride and processed montmorillonite clay. The addition of Tin (II) Chloride to the composition provides Tin for forming a ceramic-metal layer on the surfaces of the friction pair. Tin (II) Chloride provides Chlorine ions for forming Chloric films for protecting juvenile surfaces which form in the friction zone. The clay is heated and pulverized to produce a powder comprising both particles having crystalline layer structure and salts and oxides. The layered crystalline structure of the clay contains slip planes that transversely shift when tangential pressure from the friction pair is applied thereby lubricating the friction pair. The salts and oxides contribute to the formation of the ceramic-metal layer.

9 Claims, 12 Drawing Sheets

NANO-PARTICLE METAL TREATMENT COMPOSITION FOR CREATING A CERAMIC-METAL LAYER

BACKGROUND OF THE INVENTION

1. Field of the Invention

The present invention relates to metal treatment compositions for the lubrication of friction pairs.

2. Description of the Prior Art

Compositions for lubricating have long been used to prevent direct contact between surfaces of a friction pair. Much research has been done on various lubricant additives, sometimes called friction modifiers, to optimize the ability of the lubricating medium by reducing the coefficient of friction and decreasing the overall wear of the system. It is known in the art to use powders of soft metals such as Copper and Zinc, elements with low shearing bonds between layers such as graphite and disulpides, and polymer-based materials such as polytetrafluoroethylene to form protective films on the friction pair surfaces. These films promote improved tribological characteristics of the friction pair by preventing contact with the clean surfaces of the friction pair. A new direction in the field of lubricant additives points toward the use of members of the clay group of minerals. In these developments, dehydrated and pulverized clay are used as solid additives to the lubricant.

The Russian Patent 2,057,257 to Khrenov, et al., discloses a composition comprising; SiO, MgO, $Fe_2O_3$, FeO, $Al_2O_3$, and S having a particle size range of 0.01-1.0 micrometers. The treatment of this composition includes mechanical activation by aperiodic vibrations, but does not include any thermal processing. The U.S. Pat. No. 6,423,669 to Alexandrov et al. discloses a composition prepared from various minerals, which include several clays. The '669 patent teaches the use of the salts and oxides of the metals and non-metals comprising the raw minerals obtained by heating the clay at temperatures not less than 350 C.

Although the prior art discloses the use of pulverized and heated clay as an additive to a lubricant, the resultant composition does not contain or utilize the crystalline layer structure of the clay. Nor does the prior art utilize Tin (II) Chloride in their compositions. The compositions of the prior art comprise merely salts and oxides of the metals and non-metals of the clay. A composition that provides further decreases in coefficient of friction and overall system wear must be engineered.

SUMMARY OF THE INVENTION AND ADVANTAGES

The invention provides a metal treatment composition for creating a ceramic-metal layer on the surfaces of a friction pair comprising a fluid in the amount of 95.5-84 weight %, a clay powder in the amount of 3-8 weight %, a Magnesium Metasilicate ($MgSiO_3$) powder in the amount of 0.5-3 weight %, and a Tin (II) Chloride ($SnCl_2$) powder in the amount of 1-5 weight %. The Tin (II) Chloride powder, the clay powder, and the Magnesium Metasilicate powder are evenly dispersed in and suspended by the fluid thereby neutralizing the inter-particle activity of the powders.

The proposed invention uses a clay having a unique elemental combination and a layered crystalline structure. The layers contain slip planes that transversely shift when tangential pressure from the friction pair is applied thereby lubricating the friction pair. Additionally, the resultant salts and oxides in the composition are utilized to form a protective ceramic-metal layer on the surface of the friction pair. The invention also utilizes Tin (II) Chloride in the composition to provide an additional component which contributes to the formation of the ceramic-metal layer. Tin is a soft material with excellent plating characteristics. Further, Tin (II) Chloride provides additional Chlorine atoms and ions used to form the Chloric films. These films protect juvenile surfaces which may form in the friction zone. The combination of the ceramic-metal layers and the shifting of slip planes produces a decrease in coefficient of friction of the system, a reduction in overall system wear, and an increase in surface hardness.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 14 is a schematic showing the configuration of the "stepwise loading" testing scheme, FIG. 15 is a schematic showing the configuration of the "constant loading" testing scheme.

DETAILED DESCRIPTION OF THE INVENTION

The invention is a method for composing a metal treatment composition from a clay, or other mineral, found in nature for creating a ceramic-metal layer on the surfaces of a friction pair comprising the steps of; producing a clay powder, producing a Magnesium Metasilicate powder, producing a Tin (II) Chloride powder, and mixing a fluid, the clay powder, the Magnesium Metasilicate powder, and the Tin (II) Chloride powder to form the metal treatment composition. Each of the powders has a particle size range of 1-40 nanometers and each of the powders is in the X-ray amorphous state.

Each friction pair contains two surfaces and a friction zone therebetween within which the friction pair generates heat and pressure via friction. Typically, a lubricating medium, such as oil or grease, is injected into the friction zone to minimize friction between the surfaces of the friction pair. The metal treatment composition of this invention can be added to the lubricating medium before it is injected into the friction zone. The heat and pressure generated by the friction pair cause the particles in the metal treatment composition to bond with the surfaces of the friction pair to form ceramic-metal layers on each surface. These ceramic-metal layers have shown the ability to improve the tribological properties of the friction pair.

The state of X-ray amorphy is determined by the absence of noticeable peaks (also known as diffraction maxima) of crystalline objects on an X-ray pattern. These peaks are related to the blur (also known as diffusion or degradation) of diffraction lines, the extent of which is comparable to the fluctuation straggling of the intensity data. This blur is caused by the decrease of reflecting volume of the ranked crystalline structure up to the range comparable to the wavelength of the initiating radiation. There are two manners through which a powder having a state of X-ray amorphy can be achieved; thermal processing and mechanical activation. The clay powder, Magnesium Metasilicate powder, and the Tin (II) Chloride powder each achieve their X-ray amorphous state via a combination of mechanical activation and thermal processing. In other words, each powder is heated and mechanically broken down until the full X-ray amorphous state is reached.

Figure 1:
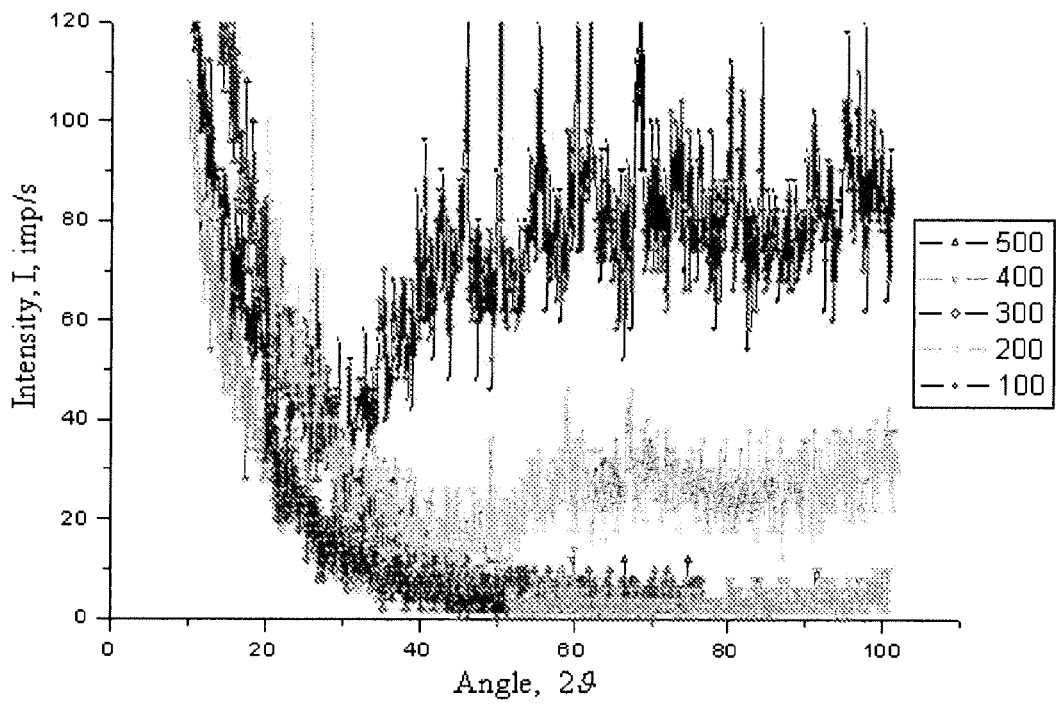
FIG. 1 is an X-ray diffraction curve plotting Intensity, I, vs. angle, $\vartheta$, at various temperatures of thermal processing of a clay powder.

The temperature range at which the crystalline structure of the clay begins to be destroyed was determined experimentally to be 100-250 C. To define this range, the control of the powder state was carried out by an X-ray technique using the X-ray diffractometer ДРОН-3М. The investigation was made using Fe—$K_\alpha$ and Cu—$K_\alpha$ radiation. Registration of the scattering was performed in discreet shooting mode with the scanning step changing in the interval $\Delta(2\vartheta)=0.01-0.05°$, dependent upon the half-width and the intensity of the diffraction lines at an exposition time of 20-100 seconds. The division of the diffraction profiles and their imposition was carried out under the "New Profile" program of division of imposed lines developed at the National Technical University "Kharkov Polytechnical Institute" in Kharkov, Ukraine. FIG. 1 shows the results of the powder investigation with regard to the temperature of thermal treatment.

These data show that utilizing thermal treatment at 100 C, the powder has crystalline structure, as indicated by the clear peaks at the curve. Thermal treatment at 300 C and over allows the powder to achieve the amorphous state as measured by X-ray methods. The thermal treatment at 200 C yields a state in which a portion of the powder is in the X-ray amorphous state and the remainder is in the crystalline state. The temperature range was determined to be 100-250 C, depending upon the composition of the raw material.

When heated within the temperature range of 100-250 C, the crystal lattices of the clay begin to be destroyed, thus leaving a powder comprising both particles with clay crystal lattices intact and smaller particles (salts and oxides) obtained via destruction of the clay. These particles are utilized to bond to the surfaces of the friction pair to form the ceramic-metal layer. The larger clay particles with intact lattice structures are utilized to create shifting slip planes to lubricate the surfaces of the friction pair in the friction zone.

The temperature ranges at which the crystalline structure of the Magnesium Metasilicate and the Tin (II) Chloride begin to be destroyed were determined, by similar investigations, to be 100-150 C and 100-120 C, respectively. The processed particles of Tin (II) Chloride Magnesium Metasilicate are utilized to form the ceramic-metal layer. The Chlorine resulting from the decomposition of the thermal processing of the Tin (II) Chloride forms Chloric films on the surfaces of the friction pair.

The particle size range of each of the clay powder (1-40 nanometers) is measured by a high-resolution X-ray low-angle scattering (XRLS) technique. The X-ray low-angle scattering investigation was carried out in the X-ray Analysis Laboratory of the Metal and Semiconductor Physics Department of the National Technical University "Kharkov Polytechnical Institute" in Kharkov, Ukraine by means of an X-ray diffractometer ДРАМ-2 in filtered Cu—$K_\alpha$-radiation using Kratky's scheme of primary beam collimation. Special hermetic cuvettes providing a 1 millimeter thickness of the subject oil were prepared. The registration of scattered radiation passed through the oil was carried out by a positional proportional detector using a 90% Xenon-10% Methane gas mixture, X-ray radiation registration complex РКД-1, and collecting and processing complex MK-1. The elimination of the collimation distortion and the subsequent processing of the XRLS curves was carried out by means of specially developed computer programs. Oils with and without the composition were investigated.

Figure 2:
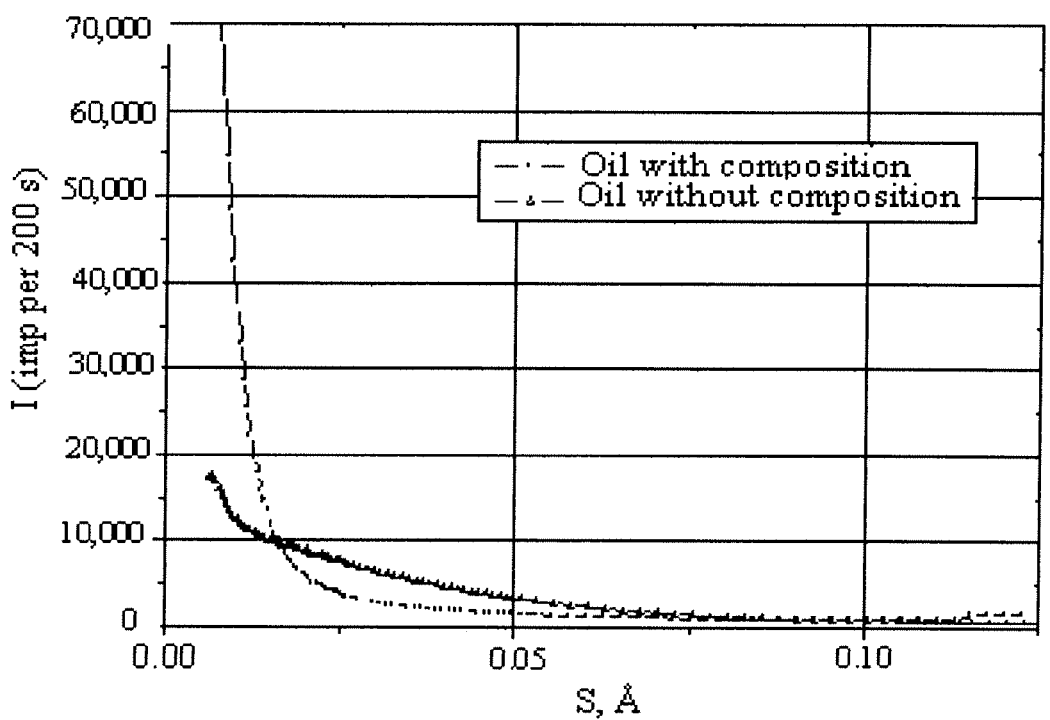
FIG. 2 is an X-ray low-angle scattering (XRLS) curve plotting Intensity, I, vs. Particle Size, S, Å, for the initial oil and the oil with the composition (C) after elimination of collimation distortions, FIG. 3 are an XRLS indicatrixes plotting the natural logarithm of Intensity, ln (I) vs. Particle Size, S, Å, for the investigated oils (with and without the composition) according to Guenier's method.
Figure 3:
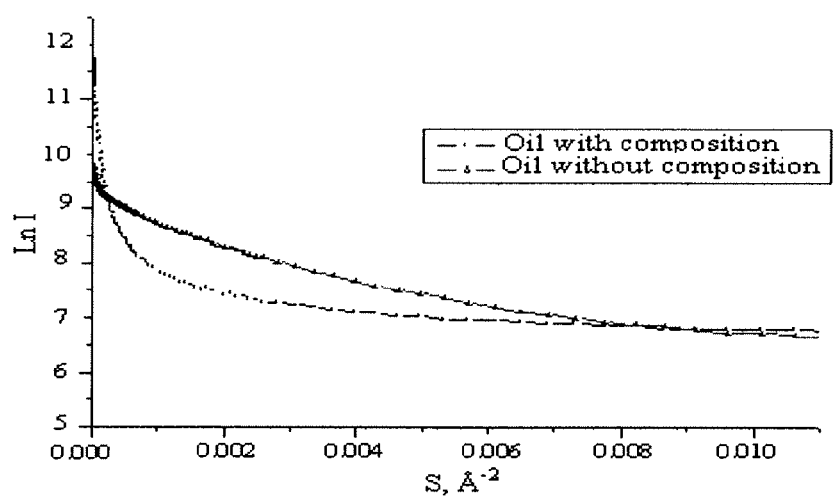

FIGS. 2 and 3 show that the character of the XRLS of the oil/composition combination differs from that of the oil itself. The fact that the oil scatters under the low angles signifies that it is an inhomogeneous medium and contains heterogeneities of electron density caused by the presence of the local disperse additives in the oil. However, the introduction of the modified solid additives (the composition) increases the integral intensity, I(s), of its XRLS due to the increase of the volume concentration of dispersing micro- and submicro-heterogeneities of electron densities. This change in the character of the XRLS distribution is caused by the sharp changes in the degree of dispersion and the sharp changes in the distribution of sizes of the heterogeneities.

The processing of the XRLS curves of the oil and the oil/composition combination was done according to the Guenier Method and shows that XRLS indicatrixes in $\ln(I-s^2)$ coordinates have the curvature in the entire range of scattering angles and do not form a straight line.

Figure 4:
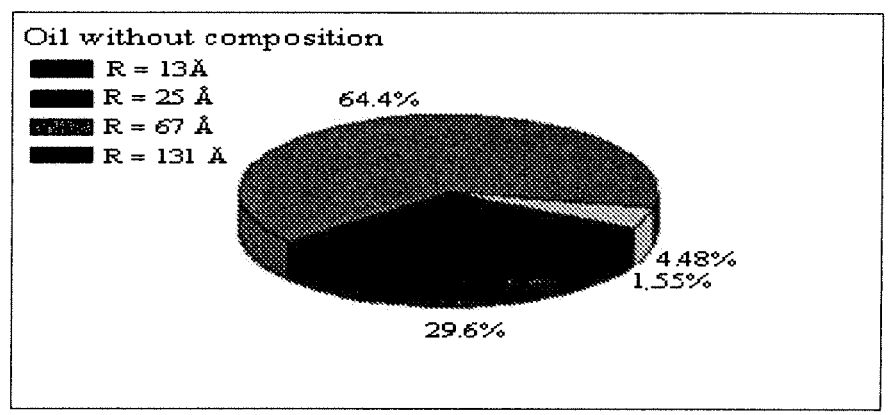
FIG. 4 is a pie chart showing the relationship of specific volumes occupied by conditional sized fractions of the electron density heterogeneities in the oil without the composition.
Figure 5:
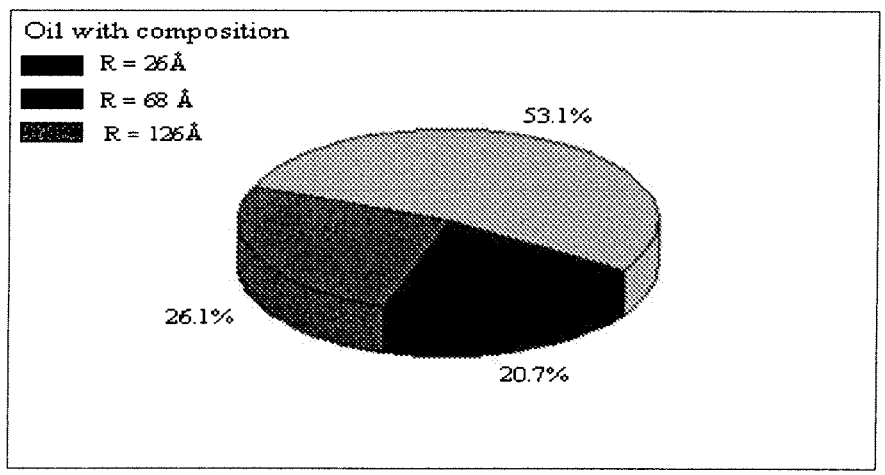
FIG. 5 is a pie chart showing the relationship of specific volumes occupied by conditional sized fractions of the electron density heterogeneities in the oil with the composition.

The assembly of the heterogeneities was divided by several conventional fractions according to their sizes and the relative volume occupied by the heterogeneities of the definite size was determined. The results of this calculation are shown in FIGS. 4 and 5. It is shown that after the introduction of the composition into the oil, the sharp re-distribution of heterogeneities, according to their sizes, had taken place. In the initial oil, the smallest heterogeneities (13-25 Å) occupied the largest specific volume (90%), while large heterogeneities (60-130 Å) occupied the smallest specific volume (6%).

The oil with the composition demonstrates a different character. Large heterogeities occupied the largest specific volume (80%), while the smaller heterogeneities occupied a much smaller specific volume (20%).

Figure 6:
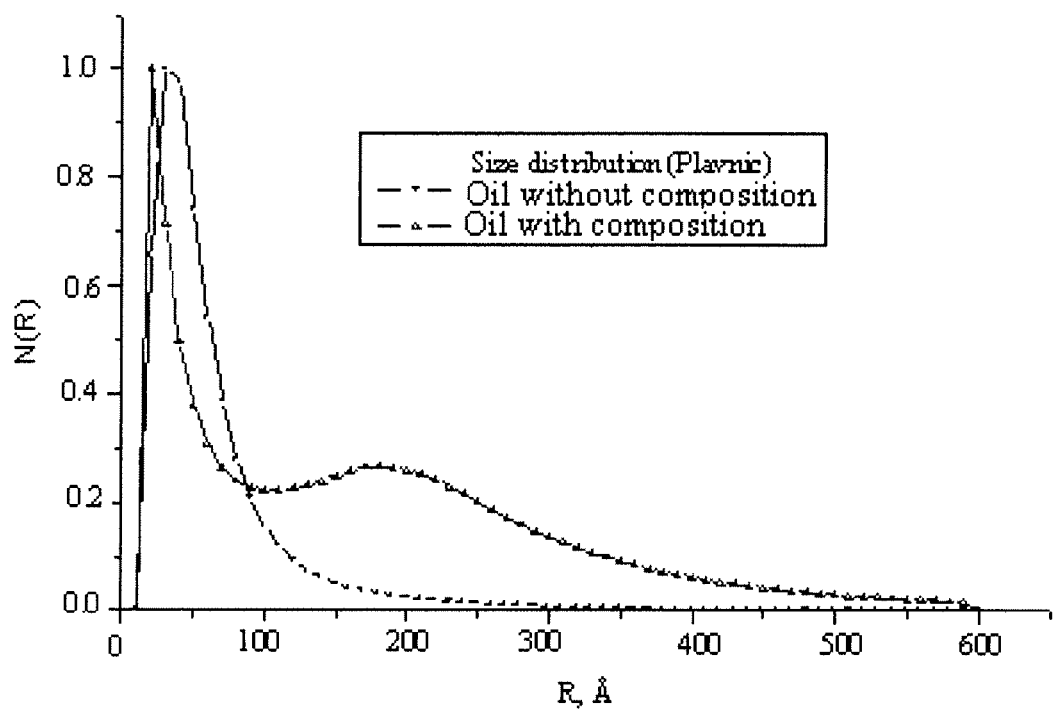
FIG. 6 is a scattering heterogeneities size distribution function plotting according to the Plavnic method for the investigated oils.
Figure 7:
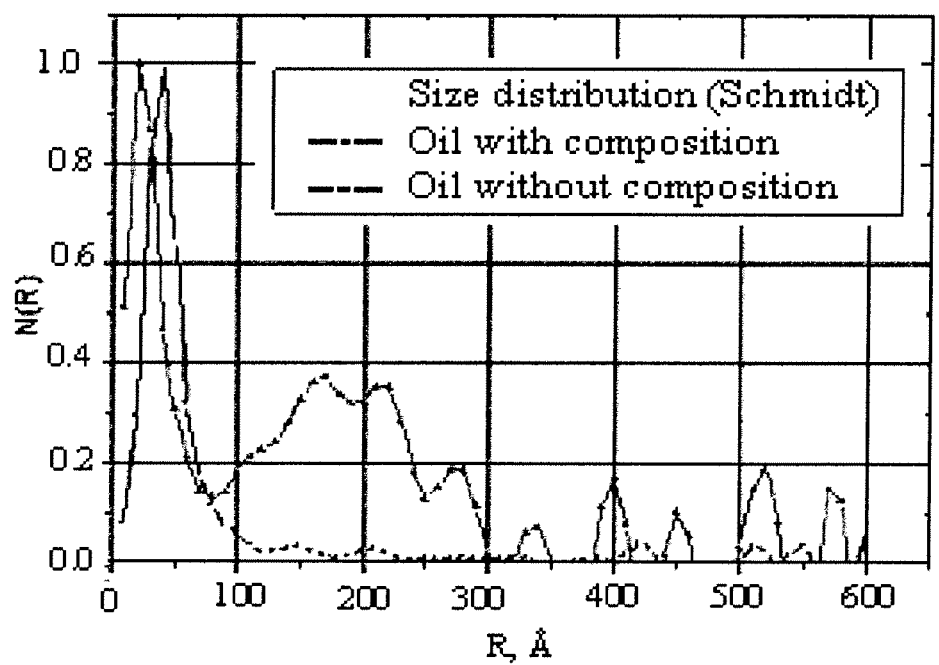
FIG. 7 is a scattering heterogeneities size distribution function plotting according to the Schmidt method for the investigated oils.

The asymptotics of the XRLS curves were subjected to Porod's Law ($I-s^4$), which means that the scattering of the micro- and submicro-heterogeneities have comparatively equiaxial form without any dominated dimension. Proceeding from the equiaxial form of the heterogeneities, it was possible to use the technique of plotting the heterogeneities distribution functions by synthesizing them from XRLS curves according to Schmidt and Plavnic without the aprioristic assumption about the character of heterogeneities distribution. The techniques principally differ by the method of averaging the size of the heterogeneities producing XLRS. It was revealed that, in contrast to the oil alone, the electron density heterogeneity distribution function of the oil/composition combination had two maxima. This fact supports the presence of two types of heterogeneities distribution according to their sizes in the oil/composition combination. These results are displayed in FIGS. 6 and 7. The small fraction has the most probable size of 30 Å, while the large fraction has the size of 180 Å. The data obtained for the different techniques of XRLS processing curves correspond well with each other.

The conclusion generated from the functions of distribution of the distances between scattering heterogeneities is that at the given volume concentration of the oil/composition combination, the most probable distance between them is 200 Å, which is the position of distribution maximum. This function for the oil alone is significantly inexpressible. This fact supports the absence of a noticeable correlation in the location of the scattering hetergeneities of the oil alone.

Within the particle size range of the clay powder, two sub-ranges are present; 1-10 nanometers and 10-40 nanometers. The former sub-range represents the salts and oxides of the metals and non-metals obtained from the natural clay and the powders of Tin (II) Chloride and Magnesium Metasilicate, while the latter sub-range represents the clay particles with intact crystal lattice structures.

Alternatively, the composition may also include a powder of Molybdenum Disulphide to optimize the run-in process. In this case, the Molybdenum Disulphide powder has a particle size range of 1-40 nanometers and is in the X-ray amorphous state. The Molybdenum Disulphide powder is processed in a manner similar to that of the Tin (II) Chloride.

The production of the clay powder comprises the following steps; accumulating the clay, washing the clay, drying the clay, breaking the clay into clay pieces, sifting the clay pieces to yield clay particles, applying and maintaining a vacuum on the clay particles, heating the clay particles, removing the vacuum, and breaking down the clay particles to achieve a clay powder having a particle size range of 1-40 nanometers and being in an X-ray amorphous state.

A clay with a layered crystalline structure is a requirement of the composition. As noted above, the layering of the crystalline structures of the clay provides opportunity for numerous shifts along the slip planes of the crystals, i.e., sliding between the layers, which facilitate the lubrication process. A clay having a flaky structure will not have the same effect as a clay having a layered crystalline structure.

The amount of Silicon in the raw clay must be at least 20 weight % Silicon has a diamond lattice structure with two interpenetrating face-centered cubic primitive lattices. Its oxide, Silicon Dioxide, SiO2, has a crystal structure in the form of a tetrahedral lattice. This oxide is one of the components utilized to form the ceramic-metal layer via sintering on the surfaces of the friction pair in the friction zone.

The amount of Magnesium in the raw clay must be at least 2 weight % Magnesium has a hexagonal close-packed structure, which has an atom at each corner of a hexagon. Its oxide, Magnesium Oxide, MgO, has a crystal structure in the form of face centered cubic lattices. This oxide is also one of the components utilized to form the ceramic-metal layer via sintering on the surfaces of the friction pair in the friction zone.

The amount of Aluminum in the raw clay must be at least 12 weight %. Aluminum has a cubic close-packed structure. Its oxide, Aluminum Oxide, $Al_2O_3$, has a crystal structure in the form of octahedral cubic lattices, i.e., a Corundum structure. This oxide is also one of the components utilized to form the ceramic-metal layer via sintering on the surfaces of the friction pair in the friction zone.

The amount of Sulphur in the raw clay must be at least 1 weight %. In the friction zone, Sulphur forms a boundary lubricating film and diffuses into thin surface layers of rubbing metal surfaces to form eutectic alloys. This diffusion results in a lower overall coefficient of friction for the friction pair.

The amount of Chlorine in the raw clay must be at least 1 weight %. Chlorine has the ability to form Chloric films on the metal surfaces of the friction pair. These Chloric films prevent unwanted contacting of juvenile (clean and un-reacted) surfaces during the operation of the friction pair, which leads to seizing. These juvenile films promote wear on the system.

The amount of Calcium in the raw clay must be less than 1 weight %. Ideally, the raw clay would be absent Calcium, however such a clay would be difficult to procure. Experimentation has shown that Calcium significantly increases the coefficient of friction of the friction pair.

The elemental requirements (Si, Mg, Al, S, and Cl) and the necessary layered crystalline structure of the clay (or other mineral) lead to the selection of montmorillonite clay. In its raw state, montmorillonite clay includes a quantity of Calcium mainly in the form of chalk and lime. As noted above, Calcium is detrimental to the overall coefficient of friction of the friction pair. As such, the montmorillonite clay is washed by suspending the pieces of clay in distilled water. While suspended, the chalk and the lime dissolve in the water. The dissolved chalk and lime are then flushed out of the slurry via additional water. The clay is then dried either in open air or in a drying oven. The clay maintains its layered crystalline structure as it is washed and dried.

After the washing and drying steps, the elemental content of the clay is as follows;

| Silicon (Si) | 20-40 weight %, |
|---|---|
| Magnesium (Mg) | 2-8 weight %, |
| Chlorine (Cl) | 1-3 weight %, |
| Aluminum (Al) | 12-25 weight %, |
| Iron (Fe) | 4-9 weight %, |
| Potassium (K) | 2-8 weight %, |
| Sodium (Na) | 1-4 weight %, |
| Sulphur (S) | 1 weight %, |
| Titanium (Ti) | 1-3 weight %, |
| Manganese (Mn) | <1 weight %, |
| Copper (Cu) | <1 weight %, |
| Zirconium (Zr) | <0.5 weight %, and |
| Calcium (Ca) | <1 weight %. |

The clay is then broken into clay pieces via crushing and grinding processes known in the art. This step is followed by sifting the clay pieces to separate clay particles in the size range of 10-100 micrometers.

These clay particles are then placed in a furnace in a closed vacuum container. The clay particles are heated to 24° C. for 105 minutes. At this temperature, two types of particles are obtained, the clay particles with intact lattice structure and the salts and oxides of the metals and non-metals obtained from the raw clay. At this stage, the particles are in a partial X-ray amorphous state. As noted above, the maximum temperature for heating the clay particles is 250 C. Heating at temperatures over 250 C does not allow the conservation of the portion of clay particles with intact lattice structure, which is necessary to provide the shifts along the slip planes. The purpose of drawing a vacuum on the particles in the furnace is to prevent oxidation of the clay particles. Additionally, the use of the vacuum decreases the time necessary to achieve the partial X-ray amorphous state by 15 minutes. In the alternative, the application of the vacuum to the particles in the furnace may be eliminated.

Following the heating step, the clay particles are broken down via mechanical activation steps so as to achieve the full X-ray amorphous state and a particle size range of 1-40 nanometers. As noted above, the full X-ray amorphous state of the clay powder is achieved via a combination of thermal processing and mechanical activation. The clay particles are pulverized to reduce particle size using crushing and grinding processes. This crushing and grinding of the particles yields a stage I powder. The stage I powder is subjected to microwave electromagnetic radiation to activate the particles of the stage I powder so as to yield a stage II powder. Finally, the stage II powder is ultrasonically processed for dispergation of the conglomerated particles that are formed during the previous treatments and to further activate the particles of the stage II powder so as to yield a stage III powder. The final product is the stage III clay powder having a particle size range of 1-40 nanometers and being in the full X-ray amorphous state. Further, the full X-ray amorphous state is a result of both the thermal processing and the mechanical activation of the clay that produce the stage III clay powder containing both ground particles with crystal lattices intact and the salts and oxides.

The production of the Magnesium Metasilicate powder comprises the following steps; sifting the Magnesium Metasilicate to yield Magnesium Metasilicate particles, heating the Magnesium Metasilicate particles in furnace in a closed vacuum container, and breaking down the Magnesium Metasilicate particles to achieve a Magnesium Metasilicate powder having a particle size range of 1-40 nanometers and being in an X-ray amorphous state.

A Magnesium Metasilicate compound, which is activated by Sulphur, comprising;

| Sulphur | 10 weight %, |
|---|---|
| Magnesium | 10 weight %, and |
| Silicon | 80 weight %, | is crushed, ground, and sifted to separate Magnesium Metasilicate particles in the size range of 10-100 micrometers.

The Magnesium Metasilicate particles are then placed in a closed furnace in a closed vacuum container. The Magnesium Metasilicate particles are heated to 130 C for 30 minutes to remove moisture. At this stage, the particles are in a partial X-ray amorphous state. As noted above, the maximum temperature for heating the Magnesium Metasilicate particles is 150 C. Heating at temperatures over 150 C initiates the processes of chemical decomposition of the Magnesium Metasilicate, and Sulphur and Oxygen liberation.

Following the heating step, the Magnesium Metasilicate particles are broken down in a fashion similar to that of the clay particles so as to achieve the full X-ray amorphous state and a particle size range of 1-40 nanometers. The full X-ray amorphous state of the Magnesium Metasilicate powder is achieved via a combination of thermal processing and mechanical activation. The Magnesium Metasilicate particles are pulverized to reduce particle size using crushing and grinding processes. This crushing and grinding of the particles yields a stage I powder. The stage I powder is subjected to microwave electromagnetic radiation to activate the particles of the stage I powder so as to yield a stage II powder. Finally, the stage II powder is ultrasonically processed for dispergation of the conglomerated particles that are formed during the previous treatments and to further activate the particles of the stage II powder so as to yield a stage III powder. The final product is the stage III Magnesium Metasilicate powder having a particle size range of 1-40 nanometers and being in the full X-ray amorphous state. Further, the full X-ray amorphous state is a result of both the thermal processing and the mechanical activation of the Magnesium Metasilicate that produce the stage III Magnesium Metasilicate powder containing activated particles.

The addition of Magnesium Metasilicate powder to the composition provides an additional component which contributes to the formation of the ceramic-metal layer in a manner similar to the oxides and salts of the metals and non-metals obtained from the raw clay. Additionally, due to the breakage of the Si—O—Si bonds in the Magnesium Metasilicate, the torn-off bonds of Si—O are generated. These bonds are acceptors of Hydrogen liberated by the decomposition of lubricant oils due to the heat of the friction zone.

The production of the Tin (II) Chloride powder is similar to that of the Magnesium Metasilicate. It comprises; sifting the Tin (II) Chloride to yield Tin (II) Chloride particles, heating the Tin (II) Chloride particles in a closed vacuum container, and breaking down the Tin (II) Chloride particles to achieve a Tin (II) Chloride powder having a particle size range of 1-40 nanometers and being in an X-ray amorphous state.

The Tin (II) Chloride is sifted to separate Tin (II) Chloride particles in the size range of 10-100 micrometers. The Tin (II) Chloride particles are then placed in a furnace in a closed vacuum container to remove moisture. At this stage, the particles are in a partial X-ray amorphous state. As noted above, the maximum temperature for heating the Tin (II) Chloride particles is 120 C. Heating at temperatures over 120 C initiates the processes of chemical decomposition of the Tin (II) Chloride, Chlorine liberation, and formation of other Tin Chlorides, e.g., Tin (IV) Chloride.

Following the heating step, the Tin (II) Chloride particles are broken down in a fashion similar to that of the Magnesium Metasilicate particles so as to achieve the full X-ray amorphous state and a particle size range of 1-40 nanometers. The full X-ray amorphous state of the Tin (II) Chloride powder is achieved via a combination of thermal processing and mechanical activation. The Tin (II) Chloride particles are pulverized to reduce particle size using crushing and grinding processes. This crushing and grinding of the particles yields a stage I powder. The stage I powder is subjected to microwave electromagnetic radiation to activate the particles of the stage I powder so as to yield a stage II powder. Finally, the stage II powder is ultrasonically processed for dispergation of the conglomerated particles that are formed during the previous treatments and to further activate the particles of the stage II powder so as to yield a stage III powder. The final product is the stage III Tin (II) Chloride powder having a particle size range of 1-40 nanometers and being in the full X-ray amorphous state. Further, the full X-ray amorphous state is a result of both the thermal processing and the mechanical activation of the Tin (II) Chloride that produce the stage III Tin (II) Chloride powder containing the activated particles.

The addition of Tin (II) Chloride powder to the composition provides an additional component which contributes to the formation of the ceramic-metal layer in a manner similar to the oxides and salts of the metals and non-metals obtained from the raw clay. Tin is a soft material with excellent plating characteristics. Further, Tin (II) Chloride provides additional Chlorine atoms and ions used to form the Chloric films mentioned above. These films protect juvenile surfaces which may form in the friction zone.

The final step in composing the composition is mixing the stage III clay powder, the stage III Magnesium Metasilicate powder, the stage III Tin (II) Chloride powder with a fluid in the following weight percentages;

| | |
|---|---|
| fluid | 95.5-84 weight %, |
| stage III clay powder | 3-8 weight %, |
| stage III Magnesium Metasilicate powder | 0.5-3 weight %, and |
| stage III Tin (II) Chloride powder | 1-5 weight %. |

The fluid utilized in the invention is mineral oil. The result of the mixing step is a combination of clay powder, Magnesium Metasilicate powder, and Tin (II) Chloride powder evenly dispersed and suspended in the mineral oil.

As a result of the electromagnetic radiation and ultrasonic dispergation applied to the Tin (II) Chloride, Magnesium Metasilicate, and clay, the particles become chemically and physically active. More specifically, the particles are inactive to one another in the fluid, but active, i.e., ready to interact with one another on the friction surfaces, when subjected to the heat and pressure of the friction zone.

As these powders are mixed with the fluid, the entire mixture is subjected to additional electromagnetic radiation and ultrasonic dispergation to prevent inter-particle adhesion. The continued activation limits inter-particle activity. The fluid acts as a neutralizer of the active particles. However, as the composition is disposed in the friction zone, the neutralizing effect of the fluid is diminished by the heat and pressure generated by the friction pair. As such, the particles react with the metal surfaces of the friction pair to form the ceramic-metal layer.

As noted above, a Molybdenum Disulphide powder can also be added to the final composition to provide additional lattice structures to form the ceramic-metal layer. Molybdenum Disulphide has a hexagonal close-packed structure with Molybdenum layers situated between two or more Sulphur layers. The bonds between Sulphur layers are weak and the breaking of these bonds yields layered structures, i.e., lattice structures, which slide in the friction zone. In this instance, the stage III clay powder, the stage III Magnesium Metasilicate powder, the stage III Tin (II) Chloride powder, and the Molybdenum Disulphide powder are mixed with the fluid in the following weight percentages;

| | |
|---|---|
| fluid | 95.4-83.85 weight %, |
| stage III clay powder | 3-8 weight %, |
| stage III Magnesium Metasilicate powder | 0.5-3 weight %, |
| stage III Tin (II) Chloride powder | 1-5 weight %, and |
| Molybdenum Disulphide powder | 0.10-0.15 weight %. |

The resultant composition is added to the lubricating medium and injected into the friction zone of the friction pair. Alternatively, the composition can be combined with a thickener such as wax, rubber, paraffin, or petrolatum to yield a gel having a higher viscosity than the original composition. Recommended weight percentages for the composition in the lubricating medium are;

| liquid lubricants (oils) | 0.1-1 weight %, and |
|---|---|
| gels (greases) | 1-10 weight %. |

When the lubricating medium is injected into the friction zone and the friction pair operates, the heat and pressure force the composition in the medium to bond with the surfaces of the friction pair. The powders dispersed in the composition remove the adsorption and oxidation products on the friction surfaces and activate both the surface layers of the friction pair and the particles of the powders themselves. At this point, the Silicon, Magnesium, and Aluminum oxides sinter onto the surfaces of the friction pair to form the ceramic-metal layer. As the sintering continues, the ceramic-metal layer builds.

In addition to the salts and oxides, the clay particles with layered crystalline structure are also disposed in the friction zone via the composition. These crystalline layers contain slip planes that promote sliding therebetween, which reduces the overall coefficient of friction of the friction pair. The ceramic-metal layer formation and the shifting slip plans are two separate mechanisms. The ceramic-metal layers are a result of the salts and oxides and the shifting slip planes are a result of the layered crystalline structures of the larger clay particles. The combination of the two contributes to the increased overall tribological properties of the friction pair. Each mechanism is a result of a different portion of particles in the composition, hence the importance of the temperature range of the heating step. Overheating of the raw clay will produce a powder comprised of only salts and oxides, which eliminates the possibility of the shifting slip planes.

The improved tribological properties of the friction pair are due to the reduction of Hydrogen wear, oxidation wear, and abrasive wear of the system. Hydrogen wear is a result of active Hydrogen ions reacting with the friction pair surfaces. The broken oxide bonds resulting from the crushing processes are active adsorbants of Hydrogen. Hence, the Hydrogen ions are accepted by materials in the composition and not by friction pair material. Additionally, the decrease of temperature in the friction zone due to the decrease in coefficient of friction reduces oil decomposition, which in turn, decreases the number of hydrogen ions liberated from the lubricating oil.

Oxidation wear occurs when the metal surfaces of the friction pair oxidize (rust) and subsequently degrade. The ceramic-metal layer significantly decreases the ability of the metal of the friction pair to react with Oxygen. As a result, less oxidation occurs.

Abrasive wear occurs when material is removed by contact with hard particles. These hard particles may be present on the surface of a second material or they may exist as loose particles between the two surfaces of the friction pair. The particle size of the particles in the composition is sufficiently small that abrasive wear is significantly reduced.

It is important to note that the resultant layer is comprised of material from the powders in the composition and not from the material of the friction pair. By creating the layer from the particles of the powder, actual wear of the friction pair materials is decreased. The elemental composition of the ceramic-metal layer is primarily Silicon, Magnesium, Aluminum, Chlorine, Sulphur. Vanadium, Chromium, Tin, Manganese, and Iron are also present but in lesser percentages. The Magnesium and Tin in the composition contribute plastic properties to the film. As mentioned above, Chlorine promotes the production of Chloric films.

EXAMPLE 1

Utilization of the composition showed improvements in surface roughness, $R_a$, of the friction pair. The working surface of the cast iron discs in the initial state had a surface finishing class of 8. The average height of the $R_a$ was 0.32-0.63 micrometers. Striped scratches and smoothed tops of ledges were observed on the surfaces of the discs during investigation under a binocular microscope at 50×. The average height of $R_a$ measured by the roughness indicator was 0.40±0.02 micrometers. Table 1 displays the results of the roughness testing.

MO represents a mineral oil, Mannol 15W-40, and SO represents a synthetic oil, Shell Helix Ultra 5W-40. C represents the composition of the invention. MO+C represents the mineral oil with the composition added, and SO+C represents the synthetic oil with the composition added.

TABLE 1

| Lubrication | Roughness after 10 hour test, $R_a$, micrometers | Change in Roughness, ΔR, micrometers |
|---|---|---|
| MO | 0.3 | 0.1 |
| MO + C | 0.25 | 0.15 |
| SO | 0.32 | 0.08 |
| SO + C | 0.26 | 0.14 |

Figure 8:
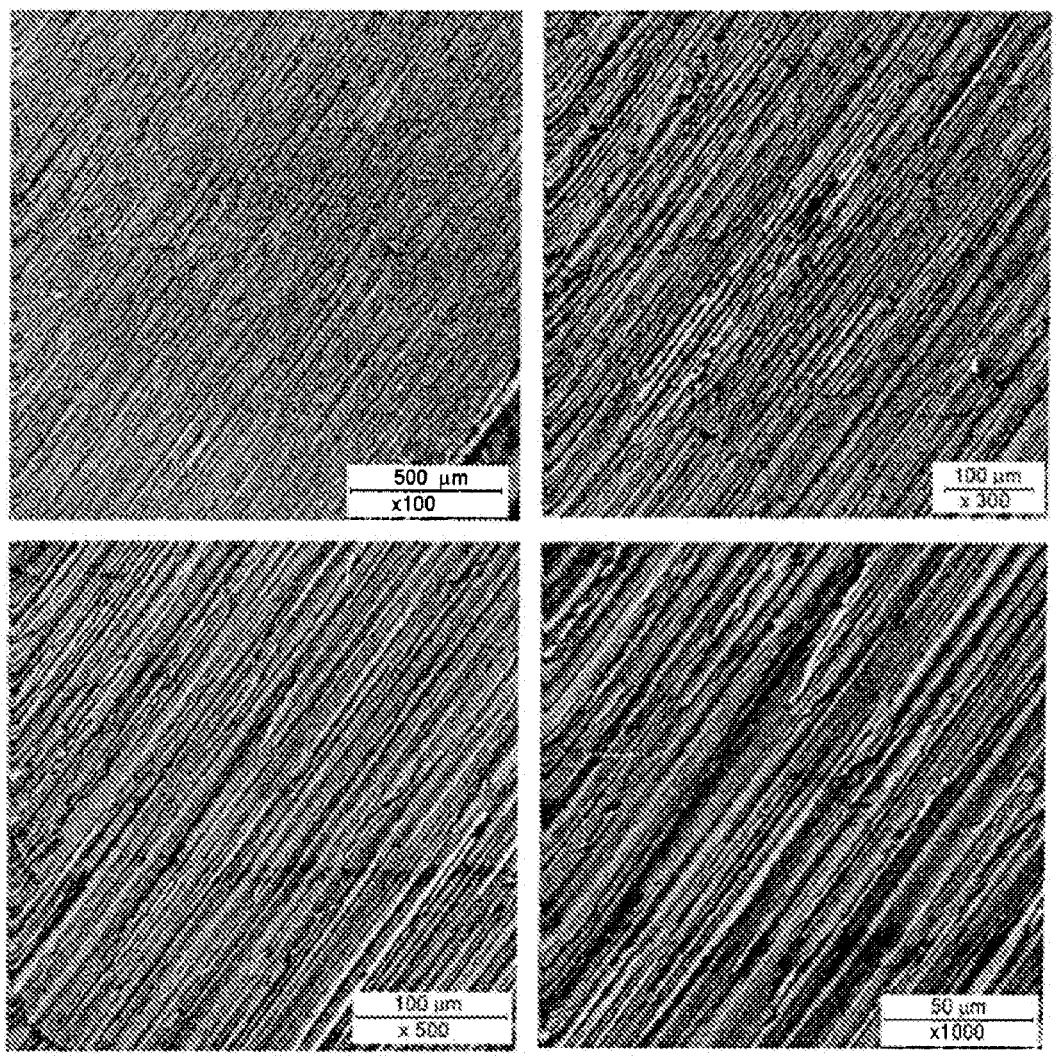
FIG. 8 is a scanning electron microscope image of the surface of a disk outside of the friction zone taken at 100×, 300×, 500×, and 1000×.

The triboelements (disks and blocks) used in the testing were investigated after the testing by means of a scanning electron microscope. The sample surfaces outside of the friction zones demonstrate the relief elements created by mechanical processing. FIG. 8 shows relief drills oriented along the direction of machining tool motion at 100×, 300×, 500× and 1000×. The drills are arranged with uniform regularity. At magnifications greater than 100×, small cracks and spalling sites are observed on the surface.

Figure 9:
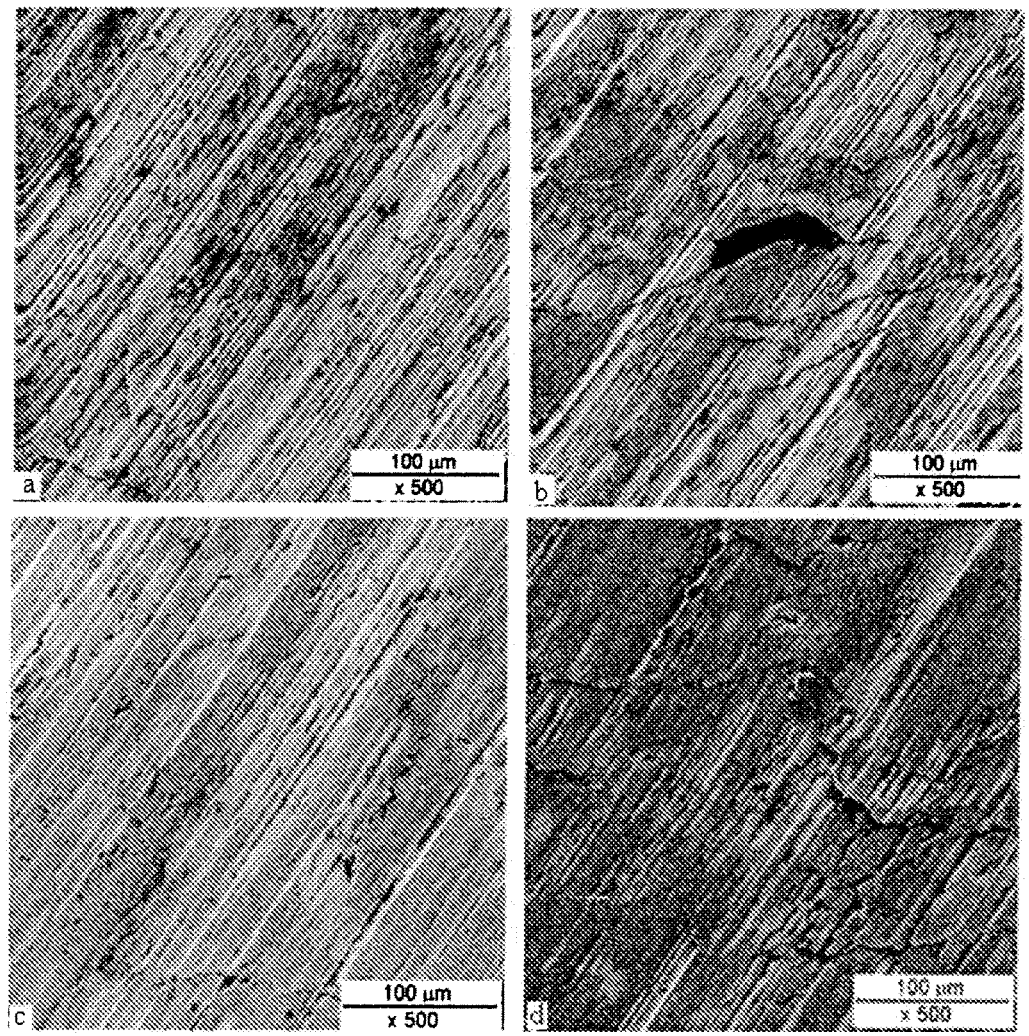
FIG. 9 is a scanning electron microscope image of the surface of a disk inside of the friction zone tested using mineral oil (a and b) and mineral oil and the composition (c and d) taken at 500×.
Figure 10:
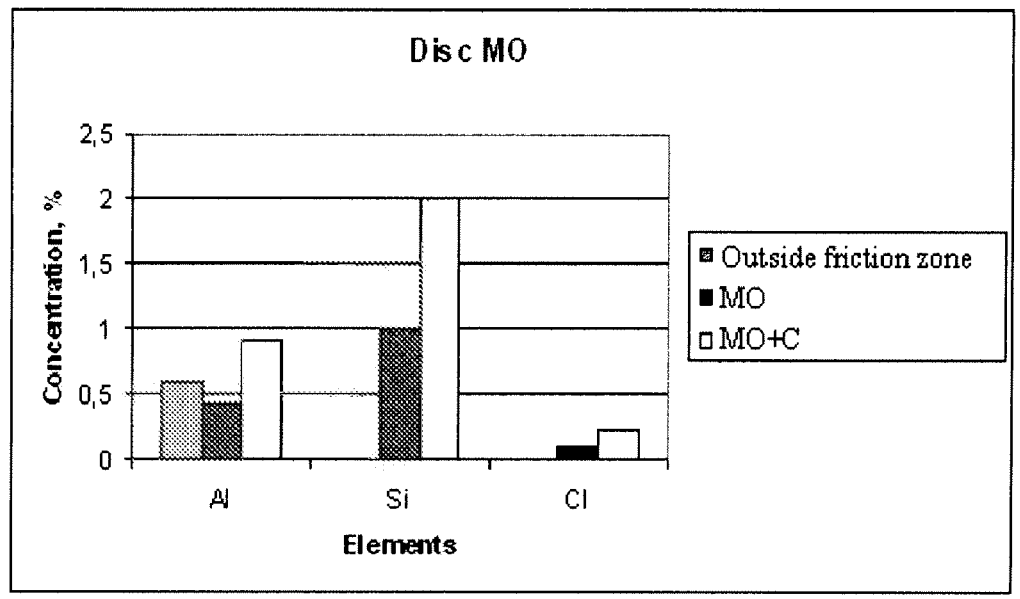
FIG. 10 is a histogram showing the change in percent composition of Al, Si, and Cl in disk material after operation of the friction pair using only mineral oil (MO) and mineral oil with the composition (MO+C) in comparison with the percent compostion of Al, Si, and Cl outside of the friction zone.
Figure 11:
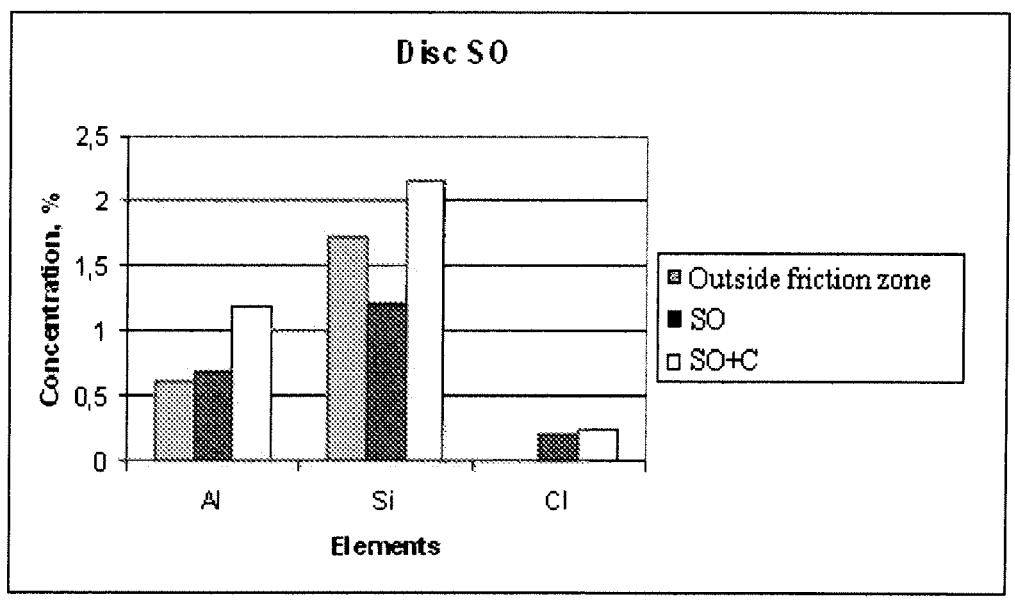
FIG. 11 is a histogram showing the change in percent composition of Al, Si, and Cl in disk material after operation of the friction pair using only synthetic oil (SO) and synthetic oil with the composition (SO+C) in comparison with the percent compostion of Al, Si, and Cl outside of the friction zone.
Figure 12:
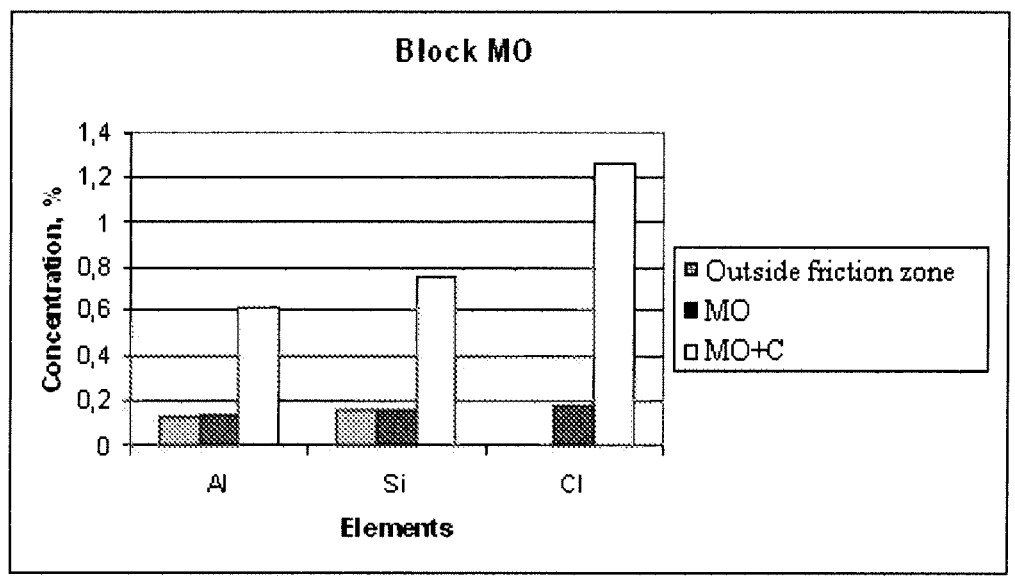
FIG. 12 is a histogram showing the change in percent composition of Al, Si, and Cl in block material after operation of the friction pair using only mineral oil (MO) and mineral oil with the composition (MO+C) in comparison with the percent compostion of Al, Si, and Cl outside of the friction zone.
Figure 13:
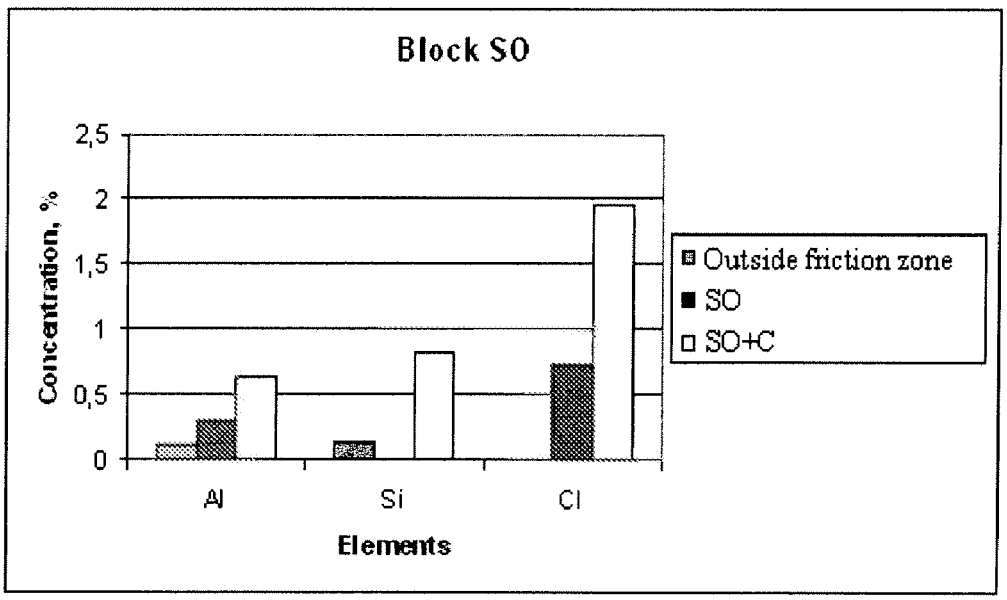
FIG. 13 is a histogram showing the change in percent composition of Al, Si, and Cl in block material after operation of the friction pair using only synthetic oil (SO) and synthetic oil with the composition (SO+C) in comparison with the percent compostion of Al, Si, and Cl outside of the friction zone.
Figure 1:
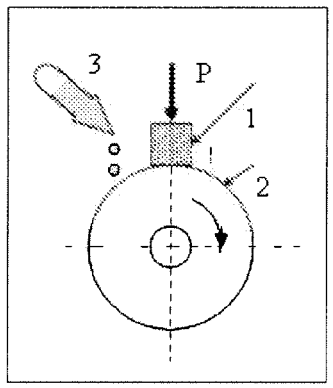
Figure 1:
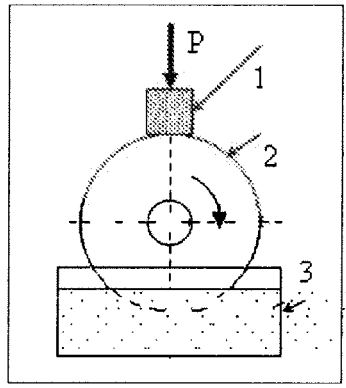

FIG. 9 shows the structure transformation observed after operating the friction pair with only MO (a and b) and with the MO+C combination (c and d). In comparing the samples where only MO was used with the samples including the composition, it can be concluded that the ceramic-metal layer has been formed on the surfaces of the friction pair. The film has the following fractographical features;

high smoothness and low surface development, low damageability (small cracks and spalling are revealed only at magnifications higher than 500×) and high toughness of the film surface, exhibition of plastic behavior, i.e., the presence of smooth shrinkages and smooth flow of the elements of relief, and the ability to fill relief dimples and cure surface microdefects.

All of these fractographical features are beneficial to the overall friction characteristics of the system, particularly the coefficient of friction.

The presence of the ceramic-metal layer was also confirmed by the X-ray fluorescent technique. The initial sample was investigated before and after being subjected to the operation of the friction pair. This method demonstrates the change in elemental content of the surfaces of the friction pair in the friction zone. Table 2 and FIGS. 10-13 display the test results.

Table 2 shows that the content of Al and Si in the friction zone after operation for the disk and the block is practically the same or smaller than before operation for the trial with only lubricating oil. When the oil/composition combination is utilized, an increase in the content of Al and Si is observed. The conclusion reached is that the increase in Al and Si content is due to the formation of the ceramic-metal layer on the surfaces of the friction pair. Additionally, the presence of Chlorine leads to the conclusion that Chloric films have formed, as was noted in the text above.

TABLE 2

| Element | Weight Percentage outside of Friction Zone | MO | MO + C | SO | SO + C |
|---|---|---|---|---|---|
| | | Weight Percentage inside Friction Zone (Disk) | | | |
| Al | 0.6 | 0.44 | 0.91 | 0.69 | 1.18 |
| Si | 1.8 | 1.01 | 2.02 | 1.22 | 2.16 |
| Cl | 0 | 0.1 | 0.22 | 0.2 | 0.25 |
| Fe | 95.06 | 94.88 | 95.05 | 93.6 | 94.5 |
| | | Weight Percentage inside Friction Zone (Block) | | | |
| Al | 0.12 | 0.14 | 0.614 | 0.29 | 0.638 |
| Si | 0.15 | 0.16 | 0.752 | 0 | 0.829 |
| Cl | 0 | 0.184 | 1.264 | 0.732 | 1.952 |
| Fe | 92.85 | 90.15 | 92.69 | 92.61 | 92.24 |

The results of the microhardness testing are shown in Table 3. the microhardness of the disks and blocks was increased after operation of the friction pair. The most significant increase in microhardness was achieved using the oil/composition combination. The conclusion reached here is that the ceramic-metal layer contributes to the hardening of the surfaces of the friction pair.

TABLE 3

| | Microhardness, GPa | | | |
|---|---|---|---|---|
| Lubrication | Disk, Before | Disk, After | Block, Before | Block, After |
| MO | 3.45 | 4.3 | 7.0 | 10.1 |
| MO + C | 3.5 | 6.8 | 7.2 | 15.2 |
| SO | 3.55 | 4.5 | 7.5 | 11.3 |
| SO + C | 3.4 | 7.1 | 7.3 | 16.8 |

EXAMPLE 2

Disks were made of gray cast iron, which has the composition shown in Table 4. To relieve stresses due to mechanical processing, the disks were tempered as follows; heating at 300 C, increasing the heat at a rate of 100 C/hour until 600 C is reached, soaking in water for three hours, cooling to 300 C at a rate of 100 C/hour, and air cooling. This tempering regime is designed to simulate the thermal regime of cylinder sleeves of diesel locomotive engines.

TABLE 4

| Elemental Content, Weight % | | | | | | | | |
|---|---|---|---|---|---|---|---|---|
| C | Mn | Si | Ni | Cr | Mo | P | S | Cu |
| 3.0–3.02 | 0.88–0.92 | 1.82–1.9 | 1.10–1.13 | 0.35–0.38 | 0.51–0.54 | 0.11–0.12 | <0.04 | 0.38–0.39 |

The blocks were sections of piston rings made of high-strength inoculated Magnesian cast iron with spheroidal graphite having a hardness of HRB 105-108. Working surfaces of the blocks were coated with 210-220 micrometers of Chromium via the electrolytic technique. Microhardness of the Chromium coating was 7-7.5 GPa.

Tribological test were carried out using the friction machines 2070CMT-1 and CMII-2. Two variants were employed; stepwise loading of the oil/composition combination with simultaneous registration of the coefficient of friction, shown in FIG. 14, and constant loading of the oil/composition combination, shown in FIG. 15.

The mobile disk piece was a 50 millimeter disk made of grey cast iron. The immobile block piece was in contact with the disk. The disk and block were fastened by a device specially designed to self-align so as to avoid skewing of the pieces. The sliding speed in all tests was 1.3 meters/second.

During the stepwise addition, the loading pressure was increased in 0.2 kN intervals every two minutes from 0.2 kN to 1.0 kN. The lubricant was added dropwise as shown in FIG. 14.

During the constant addition the testing was carried out at a permanent loading pressure of 0.5 kN for 1, 5, and 10 hours. The lubricant was added by dipping the disk into a pool of lubricant as shown in FIG. 15. The 0.5 kN loading pressure was selected so as to simulate the operation of a carbureted automobile engine.

The data was collected via the inductive unit of a CMII-2 friction machine. The coefficient of friction was calculated using the formula; $f=2M/(d*P)$, where M is the friction torque, d is the diameter of the disk piece, and P is the loading pressure. The beginning of the scoring was determined by the sharp increase of the torque and by the coefficient of friction and by the appearance of score-marks on the working surfaces. The amount of wear was calculated by weighing the samples before and after operation. The samples were washed in benzene and dried for 15 minutes before weighing. Two oils were used as lubricants; a mineral oil, Mannol 15W-40 (MO), and a synthetic oil, Shell Helix Ultra 5W-40 (SO).

Figure 16:
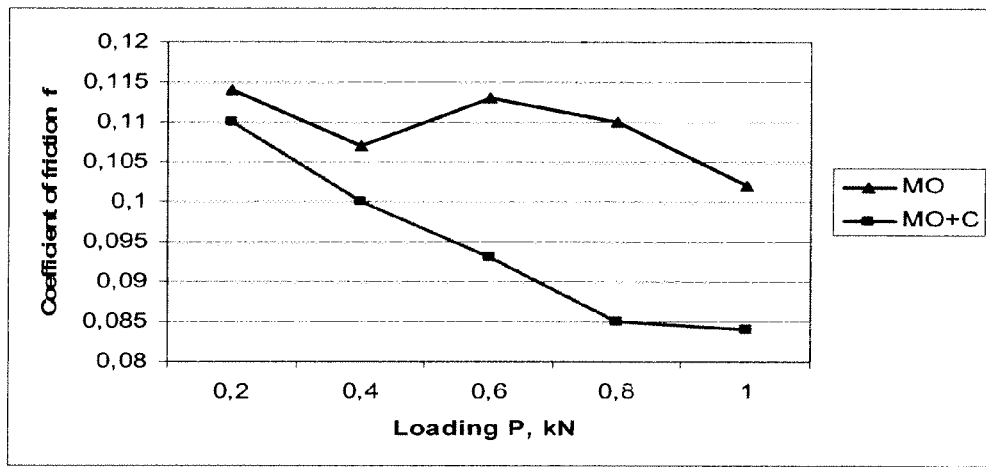
FIG. 16 is a graph plotting Coefficient of Friction, f, vs. Loading Pressure, P, for only mineral oil (MO) and mineral oil with the composition (MO+C) in the "stepwise loading" scheme.
Figure 17:
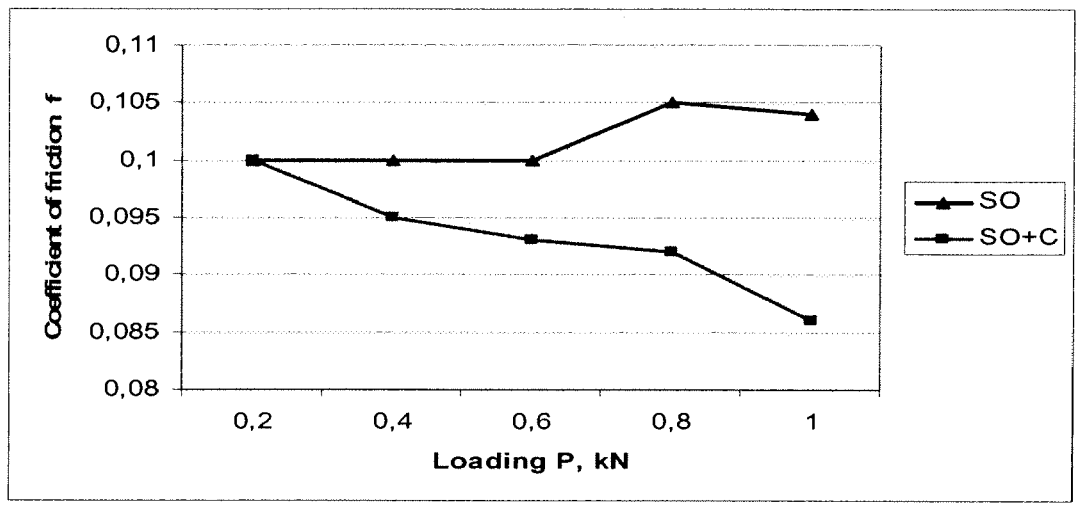
FIG. 17 is a graph plotting Coefficient of Friction, f, vs. Loading Pressure, P, for only synthetic oil (SO) and synthetic oil with the composition (SO+C) in the "stepwise loading" scheme.
Figure 18:
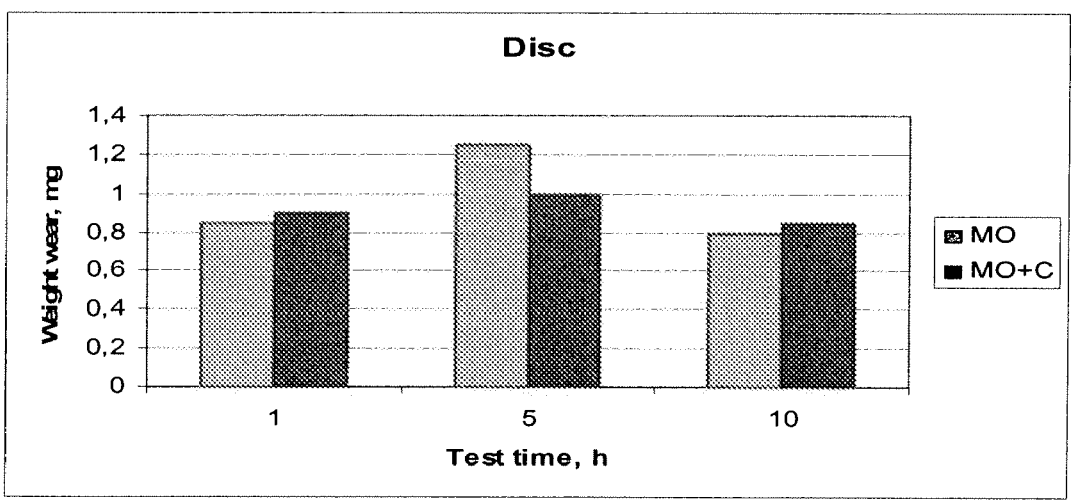
FIG. 18 is a histogram showing the wear loss of the disk after operation of the friction pair for 1, 5, and 10 hour cycles while using only mineral oil (MO) and mineral oil with the composition (MO+C)
Figure 19:
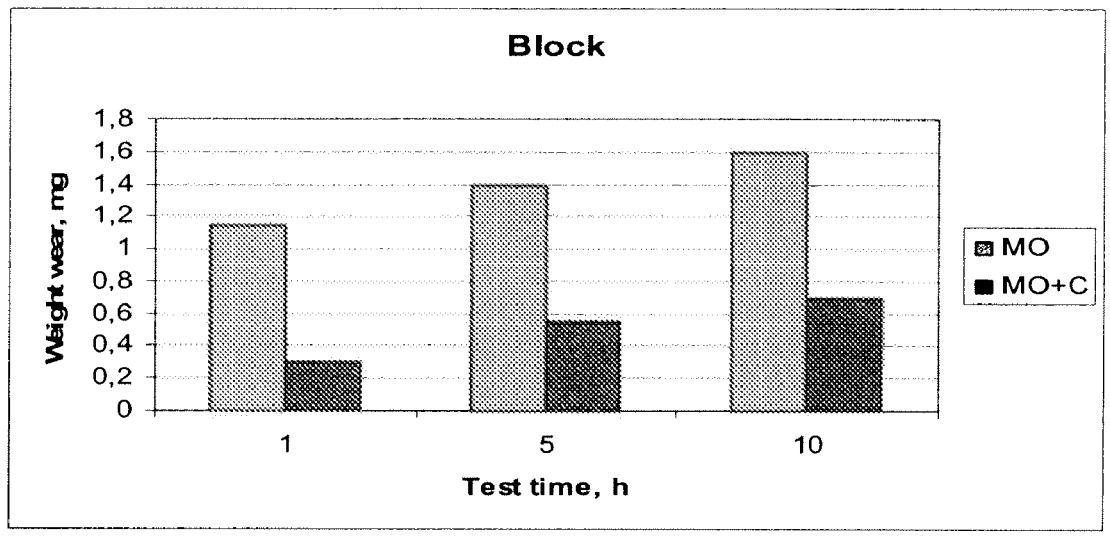
FIG. 19 is a histogram showing the wear loss of the block after operation of the friction pair for 1, 5, and 10 hour cycles while using only mineral oil (MO) and mineral oil with the composition (MO+C)
Figure 20:
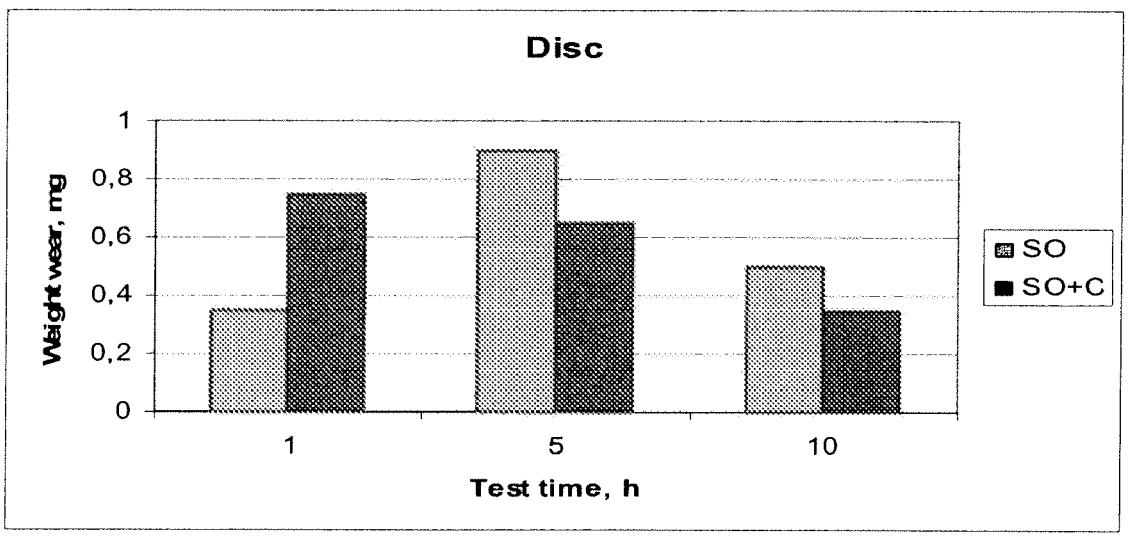
FIG. 20 is a histogram showing the wear loss of the disk after operation of the friction pair for 1, 5, and 10 hour cycles while using only synthetic oil (SO) and synthetic oil with the composition (SO+C)
Figure 21:
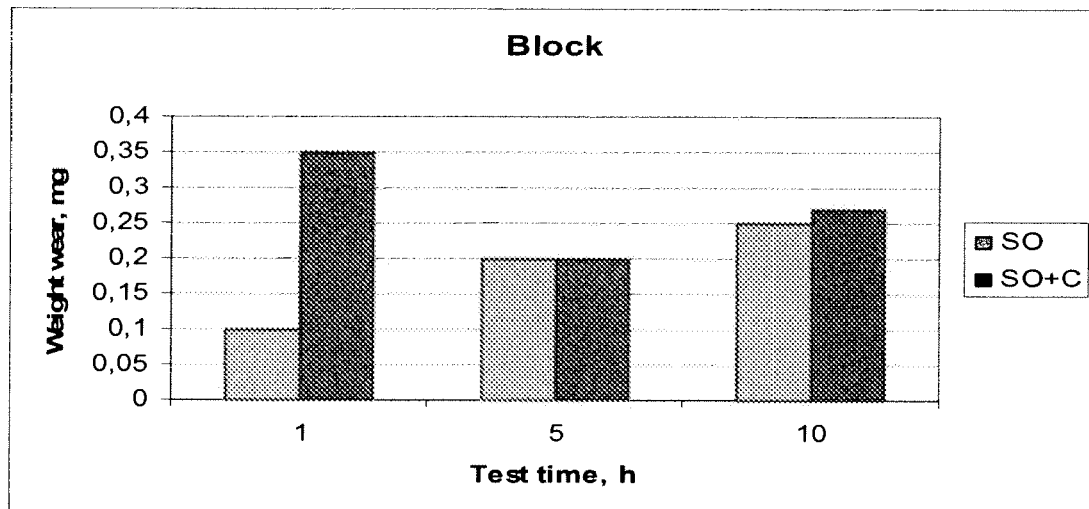
FIG. 21 is a histogram showing the wear loss of the block after operation of the friction pair for 1, 5, and 10 hour cycles while using only synthetic oil (SO) and synthetic oil with the composition (SO+C)

The results of the stepwise addition are shown in Table 5 and FIGS. 16 and 17. It should be noted that the SO, even without the added composition, provides lower coefficients of friction when compared to the MO. Only at the last stage of loading pressure are the coefficients of friction of the MO system and the SO system similar.

TABLE 5

| | Coefficient of Friction at Load, P, kN | | | | | Loading of of Score |
|---|---|---|---|---|---|---|
| Lubrication | P = 0.2 kN | P = 0.4 kN | P = 0.6 kN | P = 0.8 kN | P = 1 kN | Formation, $P_s$, kN |
| MO | 0.114 | 0.107 | 0.113 | 0.110 | 0.102 | 1.8 |
| MO + C | 0.110 | 0.100 | 0.093 | 0.085 | 0.084 | 1.8 |
| SO | 0.100 | 0.100 | 0.100 | 0.105 | 0.104 | 1.8 |
| SO + C | 0.100 | 0.095 | 0.093 | 0.092 | 0.086 | 1.8 |

The addition of the composition to both the MO and the SO results in a decrease in coefficient of friction in all loading pressure stages except the first. The coefficient of friction decrease at the maximum loading stage is 17% for both MO and SO. The introduction of the composition does not change the Loading of Score Foundation in either MO or SO.

Table 6 and FIGS. 18, 19, 20, and 21 display the results of wear tests of the permanent addition scheme. The wear amounts were measured relative to the respective initial masses (before testing). The MO with and without the composition demonstrated the same wear level on the disks for the 1 hour and 10 hours tests, however the wear decreased in the 5 hour test. The wear of the blocks was significantly decreased by the introduction of the composition.

TABLE 6

| Lubri-cation | Weight Wear, mg | | | | | |
|---|---|---|---|---|---|---|
| | Disk | | | Block | | |
| | 1 hour | 5 hours | 10 hours | 1 hour | 5 hours | 10 hours |
| MO | 0.85 | 1.25 | 0.80 | 1.15 | 1.40 | 1.60 |
| MO + C | 0.90 | 1.00 | 0.85 | 0.30 | 0.55 | 0.70 |
| SO | 0.35 | 0.90 | 0.50 | 0.10 | 0.20 | 0.25 |
| SO + C | 0.75 | 0.65 | 0.35 | 0.35 | 0.20 | 0.27 |

The addition of the composition to SO increases the amount of wear in both disks and blocks at the 1 hour stage, but in the 5 hour and 10 hour stages, the amount of wear of the blocks is at the same level for SO and the SO+C combination. The wear amount of the 10 hour stage The amount of wear of the disks is less for the SO+C when compared to only SO.

Figure 22:
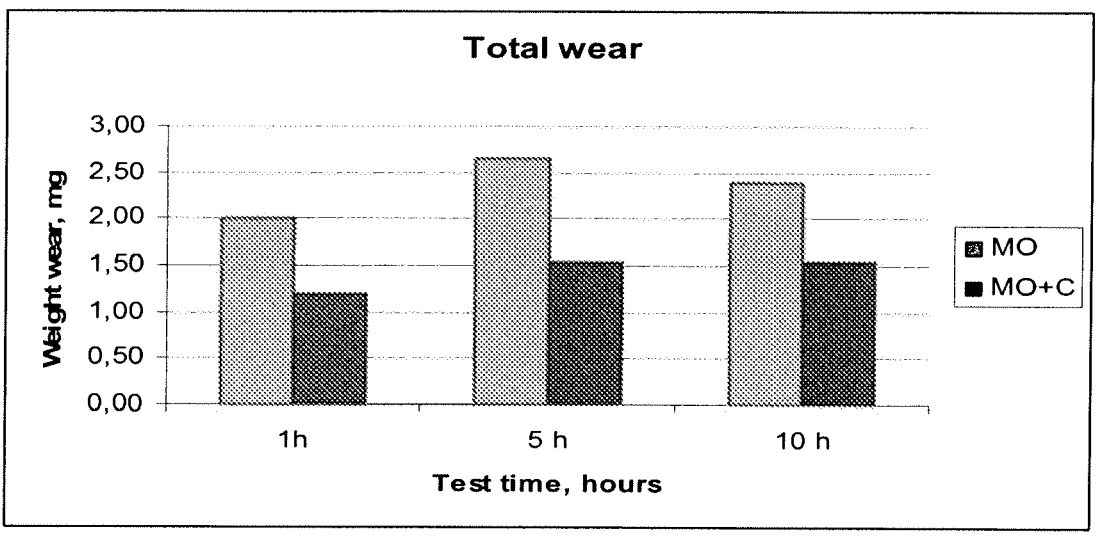
FIG. 22 is a histogram showing the total wear loss after operation of the friction pair for 1, 5, and 10 hour cycles while using only mineral oil (MO) and mineral oil with the composition (MO+C)
Figure 23:
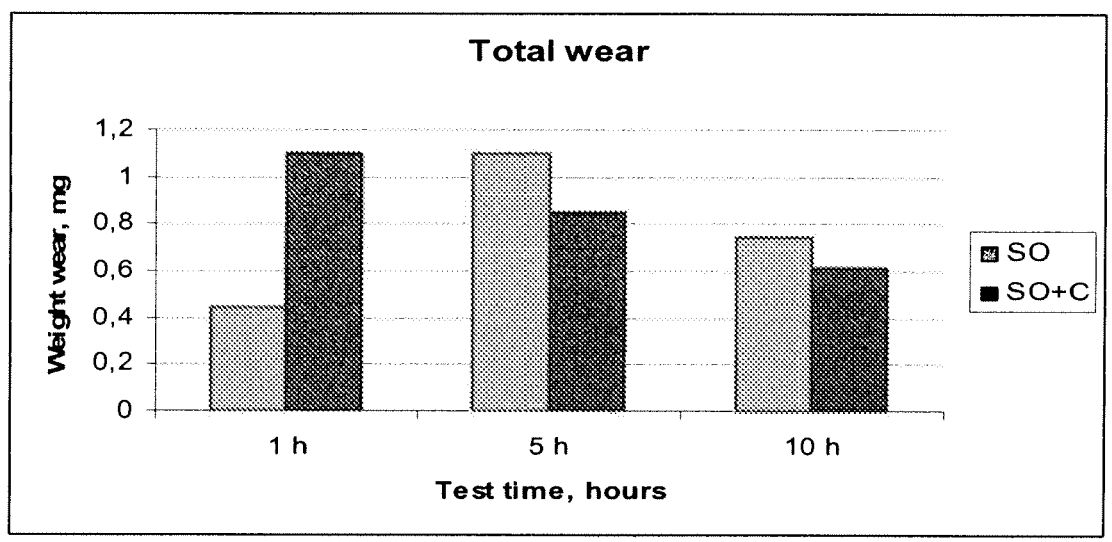
FIG. 23 is a histogram showing the total wear loss after operation of the friction pair for 1, 5, and 10 hour cycles while using only synthetic oil (SO) and synthetic oil with the composition (SO+C).

The effect of the addition of the composition is visible upon analysis of the total wear, i.e., the sum of the disk and block wear, as shown in Table 7 and FIGS. 22 and 23. The results show a significant decrease in wear throughout the range of test parameters.

TABLE 7

| Lubrication | Total Weight Wear, mg | | |
|---|---|---|---|
| | 1 hour | 5 hours | 10 hours |
| MO | 2 | 2.65 | 2.4 |
| MO + C | 1.20 | 1.55 | 1.55 |
| SO | 0.45 | 1.10 | 0.75 |
| SO + C | 1.1 | 0.85 | 0.62 |

EXAMPLE 3

Tribological tests were carried out according to a "Ring-Ring" scheme using a friction machine CMII-2 set for rolling friction with slipping. This scheme is typical for the operation of rolling bearings and gears. The diameter of the samples was 50 millimeters. The stepwise addition was similar to that of Example 1. Loading pressure was 0.2 kN and slipping was 25%. The samples were made of ШX15 steel with a hardness after treatment was 61-62 HRC. The working surfaces were lubricated at the beginning of the test by means of a paint brush. Three greases were used in the testing; Pennzoil Premium Wheel Bearing 707L Red Grease (707), 76 Omniguard QLT Grease 2 (76), and S3550 Grease (S350). The amount of the composition added to the greases was 10 weight %. The results are shown in Table 8.

TABLE 8

| | Coefficient of Friction, f, at Load, P, kN | | | | |
|---|---|---|---|---|---|
| Lubrication | P = 0.2 kN | P = 0.4 kN | P = 0.6 kN | P = 0.8 kN | P = 1.0 kN |
| 76 | 0.200 | 0.055 | 0.056 | 0.056 | 0.058 |
| 76 + C | 0.050 | 0.055 | 0.053 | 0.055 | 0.058 |
| S350 | 0.059 | 0.062 | 0.062 | 0.063 | 0.064 |
| S350 + C | 0.056 | 0.059 | 0.058 | 0.060 | 0.061 |
| 707 | 0.070 | 0.072 | 0.068 | 0.070 | 0.073 |
| 707 + C | 0.060 | 0.067 | 0.067 | 0.068 | 0.071 |

The addition of the composition resulted in a decreased coefficient of friction in all three greases. For the 76 and the 707, the decrease was the greatest at the initial stage of the test (0.2 kN). For the S350, the decrease was similar at all stages. The degree of the coefficient of friction reduction was 3.7%, 9.5%, and 7.0% for the 76, S350, and 707 greases, respectively.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A metal treatment composition for creating a ceramic-metal layer on the surfaces of a friction pair comprising;
   a fluid 95.5-84 weight %,
   a clay powder 3-8 weight %,
   a Magnesium Metasilicate ($MgSiO_3$) powder 0.5-3 weight %, and
   characterized by a Tin (II) Chloride ($SnCl_2$) powder 1-5 weight % and said clay powder and said Magnesium Metasilicate powder being evenly dispersed in and suspended by said fluid for neutralizing the inter-particle activity of said powders.

2. A composition as set forth in claim 1 wherein the particle size range of said clay powder and of said Magnesium Metasilicate powder and of said Tin (II) Chloride powder is 1-40 nanometers.

3. A composition as set forth in claim 1 wherein said clay powder comprises;

| Aluminum (Al) | 12-25 weight %, |
|---|---|
| Silicon (Si) | 20-40 weight %, |
| Magnesium (Mg) | 2-8 weight %, |
| Iron (Fe) | 4-9 weight %, |
| Potassium (K) | 2-8 weight %, |
| Sodium (Na) | 1-4 weight %, |
| Sulphur (S) | 1 weight %, |
| Calcium (Ca) | <1 weight %, |
| Titanium (Ti) | 1-3 weight %, |
| Chlorine (Cl) | 1-3 weight %, |
| Manganese (Mn) | <1 weight %, |
| Copper (Cu) | <1 weight %, |
| Zirconium (Zr) | <0.5 weight %. |

4. A composition as set forth in claim 1 wherein said Magnesium Metasilicate powder includes Sulphur and comprises;

Sulphur 10 weight %,

Magnesium 10 weight %, and

Silicon 80 weight %.

5. A composition as set forth in claim 1 wherein said clay powder comprises ground particles of said clay having crystalline structure.

6. A composition as set forth in claim 1 wherein said fluid is mineral oil.

7. A composition as set forth in claim 1 including Molybdenum Disulphide powder evenly dispersed in and suspended by said fluid for neutralizing the activity of the particles of said Molybdenum Disulphide powder.

8. A composition as set forth in claim 7 comprising;

| | |
|---|---|
| said fluid | 95.4-83.85 weight %, |
| said clay powder | 3-8 weight %, |
| said Magnesium Metasilicate powder | 0.5-3 weight %, |
| said Tin (II) Chloride powder | 1-5 weight %, and |
| said Molybdenum Disulphide powder | 0.1-0.15 weight %. |

9. A metal treatment composition for creating a ceramic-metal layer on the surfaces of a friction pair consisting of;

mineral oil, a clay powder, said clay powder having a layered crystalline structure and consisting of;

| | |
|---|---|
| Aluminum (Al) | 12-25 weight %, |
| Silicon (Si) | 20-40 weight %, |
| Magnesium (Mg) | 2-8 weight %, |
| Iron (Fe) | 4-9 weight %, |
| Potassium (K) | 2-8 weight %, |
| Sodium (Na) | 1-4 weight %, |
| Sulphur (S) | 1 weight %, |
| Calcium (Ca) | <1 weight %, |
| Titanium (Ti) | 1-3 weight %, |
| Chlorine (Cl) | 1-3 weight %, |
| Manganese (Mn) | <1 weight %, |
| Copper (Cu) | <1 weight %, and |
| Zirconium (Zr) | <0.5 weight %, | a Magnesium Metasilicate ($MgSiO(3)$) powder, said Magnesium Metasilicate powder consisting of;

| | |
|---|---|
| Sulphur | 10 weight %, |
| Magnesium | 10 weight %, and |
| Silicon | 80 weight %, | characterized by a Tin (II) Chloride ($SnCl_2$) powder and said clay powder and said Magnesium Metasilicate powder being evenly dispersed in and suspended by said mineral oil for neutralizing the inter-particle activity of said powders, and said clay powder and said Magnesium Metasilicate powder and said Tin (II) Chloride powder each having a particle size range of 1-40 nanometers.

\* \* \* \* \*